US010613016B2

(12) United States Patent
Ogumo (10) Patent No.: US 10,613,016 B2
(45) Date of Patent: Apr. 7, 2020

(54) PARTICLE ANALYZING APPARATUS USING A MEASURED PRESSURE OF AN INNER SPACE OF A SYRINGE DEVICE AND A STORED STANDARD PRESSURE TO CORRECT A PARTICLE ANALYSIS VALUE (71) Applicant: HORIBA, Ltd., Kyoto-shi, Kyoto (JP)

(72) Inventor: Katsutoshi Ogumo, Kyoto (JP)

(73) Assignee: HORIBA, Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 16/113,062

(22) Filed: Aug. 27, 2018

(65) Prior Publication Data

US 2019/0086318 A1 Mar. 21, 2019

(30) Foreign Application Priority Data

Sep. 15, 2017 (JP) ................. 2017-178409

(51) Int. Cl.
*G01N 15/14* (2006.01)
*G01N 15/10* (2006.01)
*G01N 15/12* (2006.01)
*G01N 15/00* (2006.01)

(52) U.S. Cl.
CPC ..... *G01N 15/1404* (2013.01); *G01N 15/1012* (2013.01); *G01N 15/1031* (2013.01);
(Continued)

(58) Field of Classification Search
CPC .......... G01N 15/1404; G01N 15/1012; G01N 15/1209; G01N 15/1031; G01N 15/1429;
(Continued)

(56) References Cited

U.S. PATENT DOCUMENTS 5,895,869 A * 4/1999 Von Behrens ..... G01N 15/1404
73/865.5
2002/0020207 A1* 2/2002 Shibata ................. G01P 21/025
73/1.36
(Continued)

FOREIGN PATENT DOCUMENTS

EP 1535667 A1 6/2005
EP 2672272 A1 12/2013
(Continued)

OTHER PUBLICATIONS

European Patent Office, Extended European Search Report Issued in Application No. 18190875.7, dated Feb. 22, 2019, Germany, 10 pages.

*Primary Examiner* — Michael P LaPage
(74) *Attorney, Agent, or Firm* — Alleman Hall Creasman & Tuttle LLP (57) ABSTRACT

In the particle analyzing apparatus of the present invention, first, an inner space with a negative pressure having a predetermined volume is formed in the cylinder of a syringe device for sucking a sample liquid in the measuring chamber, then, the negative pressure is applied to the measuring chamber, the sample liquid is sucked, and measurement of particle is performed in the measuring flow path. The control device calculates a particle analysis value from the measurement signal obtained by the measurement. The particle analysis value is obtained by the sucking force of the negative pressure and the control device further corrects the particle analysis value based on a standard pressure predetermined for the inner space.

6 Claims, 3 Drawing Sheets

(52) U.S. Cl.
CPC ..... *G01N 15/1209* (2013.01); *G01N 15/1429* (2013.01); *G01N 2015/0065* (2013.01); *G01N 2015/0073* (2013.01); *G01N 2015/1006* (2013.01); *G01N 2015/1037* (2013.01); *G01N 2015/1236* (2013.01)

(58) Field of Classification Search
CPC ... G01N 2015/1037; G01N 2015/1006; G01N 2015/0065; G01N 2015/1236; G01N 2015/0073; G01N 15/00; G01N 15/1434
See application file for complete search history.

(56) References Cited

U.S. PATENT DOCUMENTS

| | | | | |
|---|---|---|---|---|
| 2004/0023404 A1* | 2/2004 | Shibata | ............. | G01N 15/1456 436/155 |
| 2004/0105784 A1* | 6/2004 | Fukuju | ............. | B01L 9/06 422/68.1 |
| 2008/0250876 A1* | 10/2008 | Zhao | ............. | G01N 15/1404 73/864.22 |
| 2009/0035873 A1* | 2/2009 | Shibata | ............. | G01N 1/38 436/179 |
| 2014/0087389 A1* | 3/2014 | Heller | ............. | G01N 15/1404 435/6.15 |
| 2015/0283309 A1* | 10/2015 | Look | ............. | A61M 1/0031 606/127 |
| 2016/0018314 A1 | 1/2016 | Hamada et al. | | |

FOREIGN PATENT DOCUMENTS

| | | |
|---|---|---|
| JP | S5555237 A | 4/1980 |
| JP | 2005091098 A | 4/2005 |
| JP | 201624024 A | 2/2016 |
| JP | 2016161295 A | 9/2016 |

* cited by examiner

PARTICLE ANALYZING APPARATUS USING A MEASURED PRESSURE OF AN INNER SPACE OF A SYRINGE DEVICE AND A STORED STANDARD PRESSURE TO CORRECT A PARTICLE ANALYSIS VALUE

FIELD OF THE INVENTION

The present invention relates to a particle analyzing apparatus for analyzing particles in a sample liquid.

BACKGROUND OF THE INVENTION

As an apparatus for analyzing (counting and/or classifying) particles in a sample liquid, particle analyzing apparatuses constituted to measure and analyze particles based on an electric resistance method (also called impedance method) or flow cytometry are known (patent documents 1, 2 and the like). In these particle analyzing apparatuses, a sample liquid is flown through a measuring flow path with a small bore diameter allowing passage of particles one by one (aperture in electric resistance method and flow cell in flow cytometry), and each one of the passing particles is electrically or optically measured in the measuring flow path. In a more specific example, a measuring flow path and a subsequent connecting conduit line are provided on a container called a measuring chamber, and the sample liquid in the measuring chamber is sucked and passes through the measuring flow path by the action of a sucking pump connected to the distal end portion of the connecting conduit line, during which the particles in the sample liquid are electrically and/or optically measured.

Figure 3:
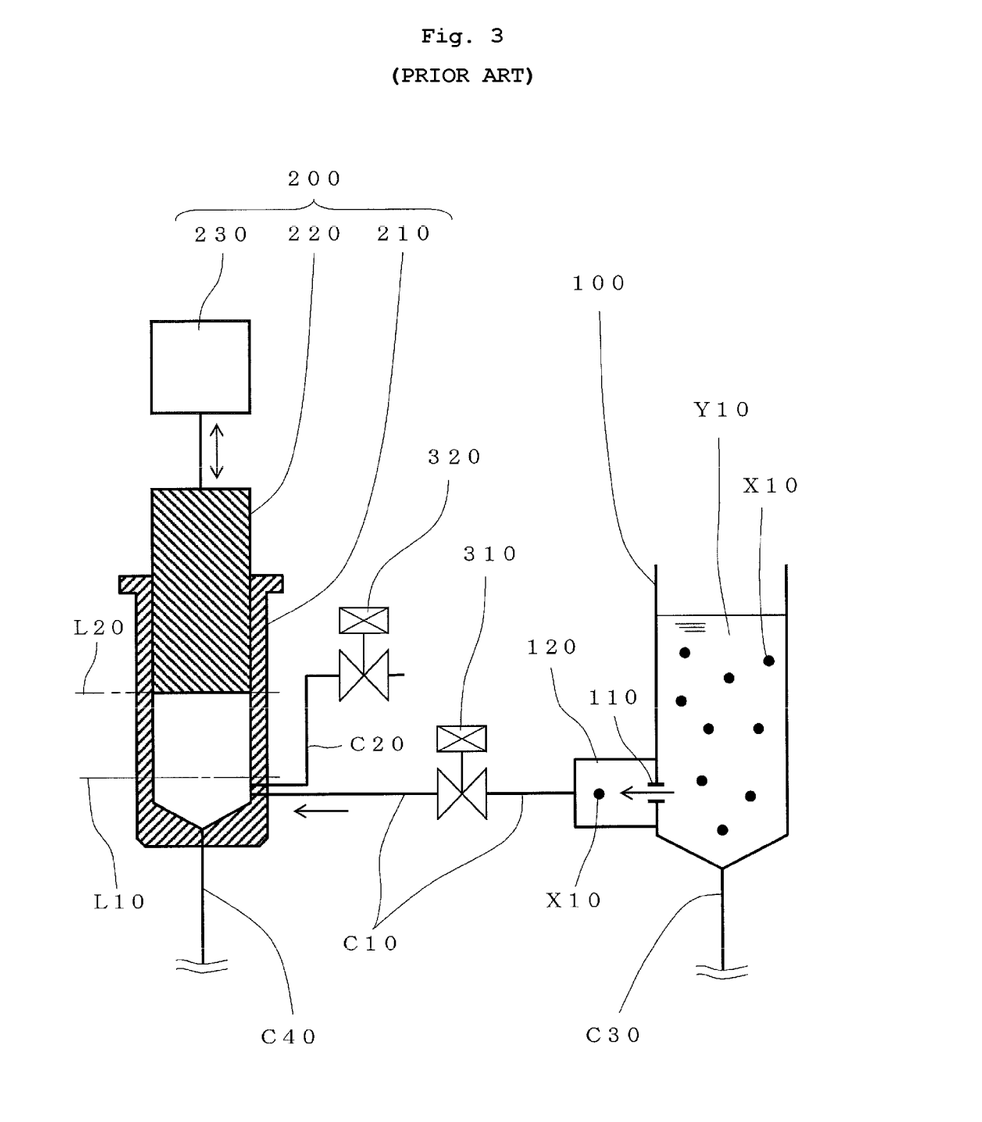

In the aforementioned particle analyzing apparatus, as a preferable sucking pump to suck the sample liquid in the measuring chamber through the connecting conduit line from the outside, a syringe device in which a piston inserted in a cylinder is driven by an actuator can be mentioned. FIG. 3 is a block diagram showing one embodiment of the constitution of the main part of a particle analyzing apparatus using the syringe device as the sucking pump. The particle analyzing apparatus shown in this Figure is an apparatus for particle analysis based on the electric resistance method, and the particle X10 to be analyzed is a blood cell and a sample liquid Y10 is a diluted specimen liquid (blood). As shown in this Figure, a measuring chamber 100 houses a sample liquid Y10 containing particle X10. A dispensing mechanism to supply a specimen liquid to the measuring chamber 100, a mechanism to supply a dilution liquid and a control device for controlling each part of the whole apparatus are not shown. An aperture 110 is provided as a measuring flow path on the wall of a lower part of the measuring chamber 100, and the measuring chamber communicates with a small chamber 120 adjacent to the outside through the aperture. Electrodes for the electric resistance method are provided in each of the measuring chamber and the small chamber to form an electrode pair (the electrodes are not shown). The small chamber 120 is connected to the syringe device 200 via a connecting conduit line C10. The conduit lines C30, C40 are pipes used for discharge and the like and normally closed. The syringe device 200 is constituted including a cylinder 210, a piston 220, and a reciprocating type actuator 230. The piston 220 reciprocates in the direction of the double-headed arrow in the drawing by the actuator 230, and sucking is performed when the piston is pulled (when moving upward in the Figure). When the syringe device 200 begins sucking, the blood cells X10 in the sample liquid Y10 in the measuring chamber 100 pass through the aperture 110 one by one as indicated by arrow, the measurement signal obtained by the electrode pair is sent to the control device, and various calculations for analysis of the blood cells are performed.

Patent Document 1: JP-A-2005-091098
Patent Document 2: JP-A-2016-024024

In the particle analyzing apparatus exemplified in FIG. 3, a method for sucking the sample liquid in the measuring chamber more preferably by a syringe device, the present inventors took note of and studied a method of sucking the sample liquid by the following procedures (i) to (iii) instead of a method of simultaneously sucking only a travel amount of the sample liquid Y10 while pulling the piston of the syringe device.

(i) First, the first valve 310 provided in the middle of the connecting conduit line C10 is closed, the second valve 320 provided in the middle of the conduit line C20 for opening the atmospheric pressure connected to the tip (lower part in the Figure) of the cylinder 210 of the syringe device 200 is opened, and the piston 220 is moved to the forward position (position L10 indicated by short dash line in FIG. 3) by pushing the piston 220. Here, the first and the second valves are, for example, electromagnetic valves that can be opened and closed by a command signal.

(ii) Then, the first valve 310 is closed and the second valve 320 is also closed, piston 220 is pulled to move the piston 220 to a predetermined backward position (position L20 shown with short dash line in FIG. 3) to create a predetermined volume of a space in the cylinder 210. The pressure in the predetermined volume of the space is, for example, a pressure about 20 kPa lower than the atmospheric pressure at that time (negative pressure).

(iii) Next, the first valve 310 is opened, the negative pressure in the cylinder is applied to the measuring flow path and the measuring chamber, and suction of the sample liquid is started.

The operation of the above steps (i)-(iii) is an operation in which the space of negative pressure having a particular volume for suction is created prior to suction, and the sample liquid in the measuring chamber is drawn into the space utilizing the negative pressure. Therefore, minute adjustment of the retraction amount (travel distance) of the piston is not necessary. As a result, while it is easy to control the piston movement, relatively stable suction force can be obtained by this operation.

However, when the present inventors studied the particle analyzing apparatus applying the operation of the above-mentioned steps (i)-(iii) in more detail, it was found that even when a space with a certain volume is created in a cylinder in the above-mentioned step (ii), the pressure in the space is not always the same, as a result of which the results of particle analysis also vary. Such a phenomenon may be caused by, among others, the following reason. That is, in a general syringe device, even if the piston is forwarded to the most distal position (the lowest point in FIG. 3) of the cylinder, a small space remains between the tip end surface of the piston and the inner wall surface of the cylinder, and a gas (air) at atmospheric pressure at that time remains. As a result, the pressure (negative pressure) in the space with a certain volume created in the cylinder by moving the piston backward varies mainly according to the atmospheric pressure at that time. Therefore, the pressure in the space in the cylinder produced when the user uses same differs by a trace amount from that in the space in the cylinder produced by the adjustment during the production of the particle analyzing apparatus. When sucking with an action of such different negative pressure is performed during use the user, the flow velocity of the sample liquid also varies. As a result, the measurement signals obtained for the same standard sample liquid vary between adjustment in a factory and use by the user. Accordingly, the particle analysis results obtained by calculating and processing such measurement signals also vary.

An object of the present invention is to solve the above-mentioned problem and provide a particle analyzing apparatus capable of particle analysis with less error by simple control while using a syringe device as a suction pump.

SUMMARY OF THE INVENTION

The main constitution of the present invention is as follows.

[1] A particle analyzing apparatus for analyzing a particle in a sample liquid, comprising
a measuring chamber for containing the sample liquid containing the particle,
a measuring flow path connected to the measuring chamber,
a particle measuring device for outputting a measurement signal relating to the particle when it passes through the measuring flow path,
a connecting conduit line with one end portion connected to an outlet end side of the measuring flow path,
a first open-close mechanism provided on the connecting conduit line,
a syringe device connected to the other end portion of the connecting conduit line,
a second open-close mechanism connected to the syringe device and for releasing an inner space formed in a cylinder in the syringe device to the atmosphere,
a pressure measuring part for measuring the pressure in the inner space, and
a control device,
wherein the control device comprises
a first motion control part for closing the first open-close mechanism and opening the second open-close mechanism to move a piston of the syringe device to a predetermined advanced position L1, and then closing the second open-close mechanism to move the piston to a predetermined backward position L2, thus forming an inner space S2 with a predetermined volume V2 and a negative pressure in the cylinder,
a pressure value receiving part for receiving the measurement value of a pressure P2 in the inner space S2 with the negative pressure from the pressure measuring part,
a second motion control part for opening the first open-close mechanism while forming the inner space S2 with the negative pressure, and sucking the sample liquid in the measuring chamber through the measuring flow path by the negative pressure to start particle measurement by the particle measuring device,
a first calculating part for determining a particle analysis value A as a result of sucking at the pressure P2 based on the measurement signal obtained from the particle measuring device, and
a second calculating part for performing calculation to correct the particle analysis value A based on the pressure P2 and a predetermined standard pressure Ps with respect to the inner space S2.

[2] The particle analyzing apparatus according to [1], further comprising a temperature measuring part for measuring a temperature T2 during measurement of the pressure P2, wherein, in the second calculating part, calculation to correct the particle analysis value A is performed by associating the temperature T2 with the pressure P2 and associating the standard temperature Ts predetermined with respect to the inner space S2 with the standard pressure Ps.

[3] The particle analyzing apparatus according to [1] or [2], wherein the control device further comprises an alarm generating part for outputting an alarm signal when the value of the pressure P2 deviates from a predetermined range, or for associating identifying information showing abnormality of the pressure P2 with the correction result of the particle analysis value A.

[4] The particle analyzing apparatus according to any one of [1] to [3], wherein the measuring flow path is an aperture for measuring a particle based on an electric resistance method, the aperture having electrodes for the electric resistance method respectively provided as a part of the particle measuring device on the upstream side and the downstream side of the aperture.

[5] The particle analyzing apparatus according to any one of [1] to [3], wherein the measuring flow path is a flow cell for measuring the particle by light irradiation and light reception, the flow cell having a light irradiating part and a light receiving part as a part of the particle measuring device for performing the light irradiation and the light reception, or the measuring flow path is a flow path with a small diameter and constituted to measure the particle by light irradiation and light reception while measuring the particle based on the electric resistance method, and having an electrode pair for the electric resistance method provided as a part of the particle measuring device in a predetermined section thereof, and a light irradiating part and a light receiving part for performing the light irradiation and the light reception.

[6] The particle analyzing apparatus according to any one of [1] to [5], wherein the particle is a blood cell.

BRIEF DESCRIPTION OF THE DRAWINGS

FIG. 3 is a block diagram showing the constitution of a main part of a conventional particle analyzing apparatus using a syringe device as a sucking pump. In this Figure, a control device is not shown. FIG. 3 also shows a valve as an open-close mechanism (e.g., electromagnetic valve capable of opening and closing by electric signal) added to a connecting conduit line to change the sucking operation of a sample liquid in the conventional particle analyzing apparatus.

Each symbol in the Figures shows the following.
10; measuring chamber, 11; measuring flow path, 20; syringe device, 21; cylinder, 22; piston, 30; first open-close mechanism, 40; second open-close mechanism, 50; pressure measuring part, 60; sampling nozzle, 70; control part, 71; first motion control part, 72; pressure value receiving part, 73; second motion control part, 74; first calculating part, 75;

second calculating part, L1; forward position of piston, L2; backward position of piston, S2; inner space, X1; particle, Y1; sample liquid

DETAILED DESCRIPTION OF THE INVENTION

In the present invention, an inner space S2 with a certain volume V2 and a negative pressure (pressure P2) is created in advance in a cylinder of a syringe device used as a sucking pump, and a sucking method including opening the first valve (the first open-close mechanism) to allow the negative pressure (sucking force) to act on the measuring flow path and the measuring chamber to suck the sample liquid is adopted. In the present invention, the pressure P2 of the inner space S2 created in the cylinder is measured and the control device is constituted to correct the particle analysis value A as the result of the suction at the pressure P2 on the basis of the pressure P2 and the standard pressure Ps predetermined for the same inner space S2. With correction by the control device, it is possible to perform particle analysis with less error without using precise and complicated pump control (control of travel amount of piston) by using a syringe device having a simple configuration as a sucking pump. In the case when the particle analyzing apparatus is installed at the same place, even if the daily atmospheric pressure changes, the particle analyzing apparatus can correct the change (=change in measurement results) of the sucking force received by such atmospheric change in the pressure, and can provide measurement results as if measured under a predetermined atmospheric pressure regardless of daily changes in the atmospheric pressure. Even if the particle analyzing apparatus is carried and the altitude of the installation site changes and the atmospheric pressure changes accordingly, and even if the ambient temperature changes, the particle analyzing apparatus can correct the measurement results and always provide measurement results as if measured under a predetermined atmospheric pressure.

The particle analyzing apparatus of the present invention (hereinafter sometimes to be referred to as the particle analyzing apparatus) is explained in detail below by referring to Example. In the Example below, an apparatus constituted to perform particle measurement based on an electric resistance method is shown. It may be an apparatus constituted to perform particle measurement based on flow cytometry and the like. In the Example, the particle to be analyzed is a blood cell, and the sample liquid is a diluted specimen liquid (blood).

In the present invention, the measurement of particles means to obtain measurement signal and measurement data relating to particles from a measuring flow path and a particle measuring device. The analysis of particles means to obtain the characteristics of particles contained in a sample liquid by calculating the measurement result of the particles. The analysis of particles may include simply counting the number of particles, measuring how many particles of what volume are present at what ratio, identifying the kind of the particles based on the volume of the particles and the like. The results of particle measurement can be used as they are as the results of particle analysis without adding calculation.

Figure 1:
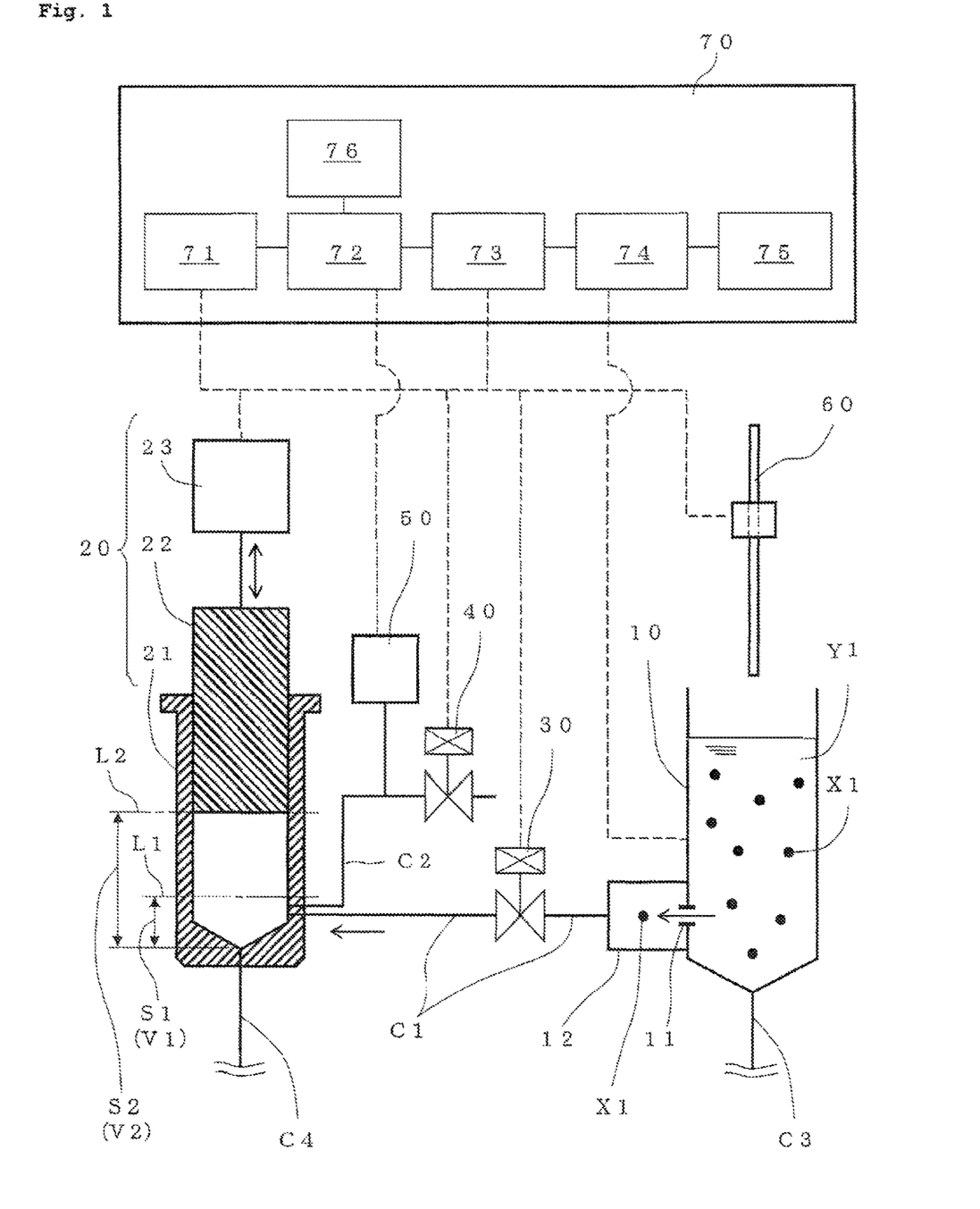
FIG. 1 is a block diagram describing the constitution of a main part of the particle analyzing apparatus of the present invention. In this Figure, a cylinder and a piston constituting a syringe device are hatched for easy illustration. In this Figure, the conduit line is shown with a continuous line, and the electric connection relationship between the control device and each part of the particle analyzing apparatus is shown with a dashed line.

FIG. 1 is a block diagram describing the constitution of a main part of the particle analyzing apparatus of the present invention. As shown in FIG. 1, the particle analyzing apparatus comprises a measuring chamber 10 for housing a sample liquid Y1 containing particles X1, a measuring flow path 11 connected to the measuring chamber 10, a syringe device 20 connected to an outlet end side of the measuring flow path 11 via a connecting conduit line C1, and a control device 70 for controlling operation of each of these parts and calculating for particle analysis.

In the example of FIG. 1, the measuring flow path 11 is an aperture for the electric resistance method directly provided on the lower part of the body of the measuring chamber 10, and the flow path with a small diameter of the aperture is connected to the space in the measuring chamber. In the example of this Figure, like FIG. 3, a small chamber 12 is provided on the outer side of the lower part of the measuring chamber 10, and the measuring chamber 10 and the small chamber 12 communicate with each other through the aperture. A particle measuring device (not shown) is attached to the measuring flow path (aperture), which outputs a measurement signal relating to the particles contained in the sample liquid when they pass through. In the example of FIG. 1, as a part of the particle measuring device, an electrode (not shown) is provided on each of the upstream side (in the measuring chamber) and the downstream side (in the small chamber 12) of the aperture. The main part (voltage measuring device, etc.) of the particle measuring device that cooperates with these electrodes to measure the electric property between the electrodes is contained in the control device 70.

The syringe device 20 is a device configured such that a piston 22 inserted into a cylinder 21 is driven by an actuator 23 to reciprocate. In the example of this Figure, the actuator 23 is a linear-motion type stepping motor that moves by an amount (distance) corresponding to a command signal from the control device 70, and makes the piston 22 travel only by the amount of the movement thereof. The syringe device 20 is connected to the outlet end side of the measuring flow path 11 via the connecting conduit line C1 so that the sample liquid Y1 contained in the measuring chamber 10 can be sucked through the measuring flow path 11. In the example of this Figure, the connecting conduit line C1 is connected to the small chamber 12, and when the syringe device 20 performs sucking, the sample liquid Y1 containing the particles X1 passes through the measuring flow path 11 and enters the syringe device 20 through the connecting conduit line C1.

A first valve (first open-close mechanism) 30 that is opened and closed by a command signal from the control device 70 is provided in the middle of the connecting conduit line C1. By the open-close operation of the first valve 30, the flow of the fluid in the connecting conduit line C1 (when open) is shut off (when closed). The syringe device 20 is further connected to a second valve (second open-close mechanism) 40 for releasing the inner space of the cylinder 21 (space formed by the tip end face of the piston 22 and the inner surface of the cylinder 21) to the atmosphere. The second valve 40 is also opened and closed by the command signal from the control device 70. The second valve may be directly connected to the cylinder 21 or may be connected via a conduit line and only needs to be connected such that the inner space of the cylinder 21 is released to the atmosphere when the second valve is opened. In the example of FIG. 1, the second valve 40 is connected to the conduit line C2 connected to the cylinder 21. When the valve 40 opens, the inner space of the cylinder 21 is released to the atmosphere through the opening at the end of the pipe line C2. For reference, when the piston 22 is moved backward (upward movement in FIG. 1) while the first valve 30 is opened and the second valve 40 is closed, simultaneously with the move backward, the sample liquid Y1 containing particles X1 and housed in the measuring chamber 10 is sucked.

In the syringe device 20, a pressure measuring part 50 for measuring the pressure in the inner space of the cylinder 21 is provided. In the example of FIG. 1, the pressure measuring part 50 is a pressure measuring instrument for measuring the absolute pressure in the inner space. The pressure measuring instrument is connected to the pipe conduit line C2, at the position between the cylinder 21 and the second valve 40. The pressure measuring part (pressure measuring instrument) 50 is connected to the control device 70, and the pressure measurement signal output from the pressure measuring part is accepted by the pressure value receiving part 72 of the control device 70. As mentioned below, the pressure measuring part may be a gauge pressure measuring instrument or further may be a device configured to be able to determine the pressure in the inner space by calculation from the measurement value of the outside atmospheric pressure and the travel amount of the piston.

The control device 70 is a device that controls each movable part of the particle analyzing apparatus, the particle measuring device, the sensor, and the like, calculates measurement signals and detection signals obtained from the particle measuring device, the sensor, and the like, and performs and outputs the particle analysis. As in the example of FIG. 1, the control device 70 includes the first motion control part 71, the pressure value receiving part 72, the second motion control part 73, the first calculating part 74, and the second calculating part 75. An alarm generating part 76 is provided in a preferable embodiment. In this Figure, for illustration, these parts 71 to 75 are arranged in series. However, the connection relation between the respective parts 71 to 75 is not limited, and the parts can communicate with each other as necessary in the control device. For example, the second calculating part 75 can directly refer to the value of the pressure received by the pressure value receiving part 72.

The first motion control part 71 of the control device first closes the first valve 30 and opens the second valve 40 (that is, releasing the inside of the cylinder 21 to the atmosphere), and moves the piston 22 of the syringe device 20 to the predetermined forward position L1. The first valve 30 may be closed when the piston 22 moves to the forward position L1, or may be closed from an early stage. Then, while the first valve 30 remains closed, the second valve 40 is closed (that is, close sealing of the cylinder 21) to move the piston 22 to the predetermined backward position L2, whereby an inner space S2 having a predetermined volume V2 is formed in the cylinder 21. At this time, the pressure P2 in the inner space S2 is a negative pressure lower than the outside atmospheric pressure P1 at that time. The temperature change in the cylinder when forming the inner space S2 in the cylinder by move the piston backward may be ignored.

The pressure value receiving part 72 of the control device receives the value of the pressure P2 (that is, the pressure measurement signal corresponding to the value of the pressure) in the inner space S2 formed to have the predetermined volume V2 from the pressure measuring unit 50. The value of the pressure P2 is used for the correction described later.

The second motion control part 73 of the control device opens the first valve 30 in a state where the inner space S2 with the negative pressure is formed in the cylinder 21, made to suck by the negative pressure, the sample liquid Y1 in the measuring chamber 10 through the measurement flow path (aperture in FIG. 1) 11, and made to start the measurement of the particles passing through the measuring flow path 11 one by one by the particle measuring device provided in the measuring flow path (in FIG. 1, electrode pair and the main part of particle measuring device (measuring circuit part such as voltage measuring device and the like)).

Strictly speaking, the pressure P2 in the inner space S2 of the cylinder 21 descends with the inflow of the sample liquid. However, since the flow of the sample liquid passing through the measuring flow path having a small bore diameter is sufficiently smaller than that of the inner space S2, the drop of the pressure P2 can be ignored, and the flow of the sample liquid sufficiently stable for particle measurement can be obtained.

The first calculation part 74 of the control device receives the measurement signal obtained by the particle measuring device and, based on the measurement signal, calculates the particle analysis value A showing the number of particles, how many particles of what volume exist at what ratio and the like. The particle analysis value A obtained by this calculation is obtained as a result of the suction at the pressure P2 and is an analysis value influenced by the pressure P2 and the atmospheric pressure P1 at that time.

As stated in the Problems to be Solved by the Invention, the present inventors took note of the fact that, in a general syringe device, even if the piston is advanced to the most distal position of the cylinder, a small inner space remains between the tip end surface of the piston and the inner wall surface of the cylinder, and a gas (air) at atmospheric pressure at that time remains. The influence of the small inner space is explained here.

As shown in FIG. 1, when the second valve is opened (release to atmosphere), the inner space present at the forward position L1 of piston 22 is S1, the volume at that time is V1, the atmospheric pressure at that time is P1, and the temperature is T1. The relationship of P1, V1 and T1 of the small inner space S1 in the open state to the atmosphere is represented by the following equation (1):

$$P1 \times V1 = n \times R \times T1 \tag{1}$$

wherein n is the amount of gas (air) (mol number), and R is a gas constant.

Then, at the forward position L1 of the piston 22, when the first and the second valves are closed to sealingly close the inside of the cylinder and the piston 22 is moved back to the backward position L2, the inner space is S2, the volume is V2, and the pressure in the inner space S2 is P2. The temperature remains T1.

The relationship of P1, V1 and T1 of the small inner space S1 in the state of reduced atmosphere is represented by the following equation (2):

$$P2 \times V2 = n \times R \times T1 \tag{2}$$

From the above-mentioned equations (1), (2), P2=P1 (V1/V2) is obtained. (V1/V2) means calculation of dividing V1 by V2.

The suction force when the measurement of particles is started is a force corresponding to the differential pressure (P1−P2) between the pressure P2 in the inner space S1 and the atmospheric pressure P1 acting on the sample liquid in the measuring chamber, and the P1−P2 is represented by the following equation (3) from the above-mentioned equations:

$$P1 - P2 = P1 \times [1 - (V1/V2)] \tag{3}$$

In the above-mentioned equation (3), (V1/V2) is always constant, and therefore, it is clear that the differential pressure (P1−P2) to be the sucking force varies depending on the influence of the atmospheric pressure P1 at that time. In the present invention, this point was noted and the pressure Ps (volume of inner space S2 then is V2) produced in the cylinder by moving the particles from the predetermined forward position L1 to the predetermined backward position L2 during manufacture (adjusting) by the particle analyzing apparatus is the standard pressure. The particle analysis value A when sucked by the same pressure P2 (volume of inner space S2 then is V2) produced by moving the particles from the predetermined forward position L1 to the predetermined backward position L2 during use by the user is corrected based on the pressure P2 and the standard pressure Ps. That is, the particle analysis value A when sucked by the pressure P2 generated by the piston movement between the predetermined positions (L1–L2) is corrected to the particle analysis value As when sucked by the standard pressure Ps generated by the piston movement between the same predetermined positions (L1–L2). The calculation for the correction is performed in the second calculating part described next.

The second calculating part 75 of the control device performs calculation to correct the particle analysis value A to a particle analysis value As at a predetermined standard pressure Ps with respect to the inner space S2.

It is preferable that the standard pressure Ps is previously determined and retained or stored in the control device.

The particle analysis value A varies in proportion to the pressure P2 in the inner space S2 formed for suction. That is, as the pressure P2 becomes lower (the negative pressure becomes larger), the sucking force becomes larger and the flow velocity of the sample liquid and particles passing through the measuring flow path becomes higher. The syringe device always forms a constant inner space S2, and the first calculating part 74 of the control device calculates the particle analysis value A without considering actual variation in the negative pressure. However, when the flow velocity of the sample liquid or particles passing through the measuring flow path increases, the number of particles passing through the measuring flow path increases within a predetermined time. Therefore, the particle analysis value A indicating the number of particles in the sample liquid becomes a value indicating that the number of particles contained in the sample liquid of a predetermined volume is larger. For example, in the electric resistance method, when the volume of particles is calculated from the measured pulse width and the flow velocity of the particles passing through the measuring flow path (aperture) increases, the measured pulse width apparently decreases. Therefore, the particle analysis value A indicating the volume of each particle becomes a value indicating a smaller volume.

Thus, in correction in the second calculating part 75, when the analysis content (analysis item) of the particle analysis value A is directly proportional to the pressure P2 like the number of particles contained in the sample liquid with a predetermined volume, for example, as in the following equation (4), the particle analysis value A can be corrected to a particle analysis value As under a predetermined pressure Ps by multiplying the particle analysis value A by (Ps/P2).

$$\text{particle analysis value } As = (Ps/P2) \times \text{particle analysis value } A \quad (4)$$

In the above-mentioned equation (4), (Ps/P2) mean calculation of dividing Ps by P2.

The above equation is one embodiment, and an equation for obtaining the particle analysis value by correcting the particle analysis value A using the standard pressure Ps and the pressure P2 when in use may be obtained experimentally, an equation added with an experimentally determined coefficient and experimentally determined equation item or the like.

On the other hand, when the analysis content of the particle analysis value A is inversely proportional to the pressure P2 like the volume of individual particles, the particle analysis value A is corrected to a particle analysis value under a predetermined pressure Ps by multiplying the particle analysis value A by (P2/Ps).

In the correction, an appropriate correction may be further added to cancel the variation factor when there are further variation factors to be taken into consideration.

By the above-mentioned constitution, the object of the present invention is achieved and it is possible to perform particle analysis with less error without using precise and complicated pump control while using a syringe device as a sucking pump. In the following, more specific embodiment and alternative embodiment of the constitution of each part are described, and a preferable embodiment to be further added is described.

[Particle and Sample Liquid]

The particles to be analyzed by the particle analyzing apparatus are not particularly limited, and various particles such as blood cells such as erythrocytes, leukocytes, platelets and the like, particles made of inorganic materials such as ceramic particles, and the like, particles made of a resin material such as polystyrene and the like, and the like can be mentioned. Particularly, the usefulness of the present invention is especially remarkable in a particle analyzing apparatus (blood analyzing apparatus) which analyzes blood cells such as erythrocyte, leukocyte, platelet and the like. A plurality of combinations of the measuring chamber and the measuring flow path may be provided, and when the particle analyzing apparatus is a blood cell analyzing apparatus, a constitution for immunoassay may be added.

[Measurement Principle of Measuring Flow Path]

In the example of FIG. 1, the measuring flow path 11 is an aperture for measuring particles based on the electric resistance method, and electrodes (not shown) for the electric resistance method are respectively provided on the upstream side and the downstream side of the aperture as a part of the particle measuring apparatus. The control device is constituted to apply a voltage between the electrodes, measure changes in voltage and electric current between the electrodes, process the measurement results (measurement signals), and perform particle analysis calculation.

The measuring flow path 11 may be a flow cell for performing measurement of particles by light irradiation and light reception (so-called measurement of particles based on flow cytometry). In this case, a light irradiating part and a light receiving part to perform the light irradiation and light reception are formed on the flow cell as a part of the particle measuring device. The control device is constituted to operate the light irradiating part and the light receiving part, process measurement of the signal obtained from the light receiving part, and perform calculation of the particle analysis.

The measuring flow path 11 may be a flow path with a small diameter and configured to perform measurement of particles by light irradiation and light reception while performing measurement of particles based on the electric resistance method. Such measurement method is also called a light-focused flow impedance method. In this case, an electrode pair for the electric resistance method is provided as a part of the particle measuring device in a predetermined segment of the flow path with a small diameter, and a light irradiating part and a light receiving part to perform the above-mentioned light irradiation and light reception are provided. The control device is constituted to operate the light irradiating part and the light receiving part and process the measurement signal obtained from the light receiving part and perform calculation for particle analysis.

[Syringe Device]

The bore diameter of the cylinder of the syringe device is not particularly limited. For use as a sucking pump connected to a measuring chamber of a conventional desk top size or large size blood analyzing apparatus, the bore diameter of the cylinder is about 5 mm-100 mm.

An actuator for reciprocating the piston is not particularly limited. As an actuator which can be operated with high dimensional accuracy by a command signal from a control device, a direct acting stepping motor can be mentioned.

The travel distance (stroke length) of the piston varies depending on the bore diameter of the cylinder. For use for the above-mentioned blood analyzing apparatus, it is about 5 mm-100 mm.

Alternatively, the syringe device may be a device of a sealed container having an inner space of a certain volume (for example, the same volume as the volume V2 of the inner space S2) to which an external vacuum pump is connected and possibly having a reduce pressure of the inner space. The pressure P2 similar to the above-mentioned syringe device can be obtained by connecting the connecting conduit line C1 and the pressure measuring part shown in FIG. 1 to such container having an inner space possibly having a reduce pressure, and similar correction based on the standard pressure Ps becomes possible.

[Inner Space Formed in Cylinder of Syringe Device and Pressure of the Inner Space]

The volume V2 of the inner space S2 formed in the cylinder of the syringe device according to the command signal of the above-mentioned first motion control part is not particularly limited. For use as a sucking pump connected to a measuring chamber of a desk top size or large size blood analyzing apparatus, about 1 mL-100 mL is a preferable volume (mL shows milliliter).

When the piston is located at the forward position L1, there is actually no syringe device having no inner space in the cylinder. In a general syringe device, even if the piston is advanced to the most distal position of the cylinder, a small inner space (S1 in FIG. 1) remains between the tip end surface of the piston and the inner wall surface of the cylinder. In addition, a suitable inner space S1 may be intentionally formed by appropriately determining the forward position L1 of the piston. The volume V1 of such inner space S1 is, for example, not more than about 100 mL, particularly not more than about 10 mL.

When the inner space S1 is present, the above-mentioned inner space S2 is a sum of the inner space S1 and the inner space formed by the movement of the piston from the forward position L1 to the backward position L2.

The pressure P2 formed in the above-mentioned inner space S2 is not particularly limited. For use as a sucking pump of the blood analyzing apparatus and within the range of the volume the above-mentioned inner space S2 determined by the predetermined backward position L2, the pressure P2 as expressed by the gauge pressure (differential pressure atmospheric pressure during measurement (−10 kPa) to (−30 kPa).

The standard pressure (negative pressure) Ps only needs to be pre-stored in a memory part of the control device or the like or a program or the like for reference by the control device. The standard pressure Ps is not particularly limited. When the atmospheric pressure outside the cylinder at the time of determining the standard pressure Ps is the standard atmospheric pressure (101325 Pa), in particular, the standard atmospheric pressure (101325 Pa) at 25° C., the pressure when forming the inner space S2 defined by the predetermined backward position L2 is preferable. For example, when expressed by the gauge pressure, it can be selected as the standard value for correction from the range of about (−21 kPa) to (−25 kPa). A specific Example thereof is −23 kPa.

[The First Open-close Mechanism, the Second Open-close Mechanism]

The first and second open-close mechanisms may be any as long as they are capable of performing an opening and closing operation of the conduit line according to the command of the control device and, for example, an electromagnetic valve is preferable. It may be a valve that opens and closes a conduit line by air pressure controlled by the control device or a flow path open-close device that provides the same open-close action similar to the valve or the like.

[Pressure Measuring Part]

The pressure measuring part may be any device that is configured to obtain the pressure value of the space in the above-mentioned cylinder (in particular, the inner space S2) described above. The value of the pressure in the space in the cylinder obtained by the pressure measuring part is configured to be sent to the pressure value receiving part of the control device. A preferred embodiment of the pressure measuring part is a pressure measuring instrument connected to the cylinder as illustrated in FIG. 1. A preferred embodiment of the pressure measuring part is an absolute pressure measuring instrument (for measurement of pressure in the cylinder) connected to the cylinder. In addition, an atmospheric pressure measuring instrument (absolute pressure measuring instrument) may be further provided outside the cylinder. It may be configured to send the absolute pressure value inside and outside the cylinder to the pressure value receiving part, calculate the differential pressure, and confirm the negative pressure. The pressure measuring part may also be a gauge pressure measuring instrument.

In the present invention, absolute pressure is used as the pressure P2 in the inner space S2 when the user is using and the standard pressure Ps in the inner space S2. Gauge pressure may also be used.

In an alternative Example, the pressure measuring part may be constituted by a pressure measuring instrument or a pressure sensor for measuring the outside air pressure and a pressure sensor and a calculating part. As is clear from the above-mentioned equation (3), the pressure P2 of the inner space S2 can also be calculated from the value of the atmospheric pressure P1 at that time (V1, V2 are known). In this embodiment, for example, a pressure measuring instrument for measuring the atmospheric pressure P1 or a pressure sensor is formed in an appropriate place in the apparatus. The measurement signals of the pressure measuring instrument or pressure sensor are sent to a calculating part in the control device, and the pressure P2 in the inner space S2 is calculated using the atmospheric pressure P1, known V1, V2 and based on the above-mentioned equation (3). The calculated value of the pressure P2 is sent to the pressure value receiving part in the control device.

Since it is possible to more accurately measure the pressure P2 including even the influence of the temperature inside the cylinder, a pressure measuring instrument (absolute pressure measuring instrument or gauge pressure measuring instrument) connected to directly measure the pressure in the inner space of the cylinder 21 as in FIG. 1 is a preferable embodiment of the pressure measuring part.

[Control Device]

The control device may be constructed by a logic circuit and the like, and a computer is suitable. In the computer, a program constituted to control the operation of each part of the particle analyzing apparatus and perform calculation for analysis is executed.

An electric power source, an air pressure source, a driver, an external measuring device, a motor and the like that receive a command (electric signal) from the control device and operate each part may be provided as appropriate.

[Dispensing Mechanism]

FIG. 1 shows a sampling nozzle 60 as a part of the dispensing mechanism for supplying the sample liquid into the measuring chamber or for preparing the sample liquid in the measuring chamber. The sampling nozzle 60 is an elongated tube that moves to a sample container, a reagent container provided as necessary, and other measuring chamber under control of the control device and sucks and discharges the specimen liquid, a reagent solution, and the like. The sampling nozzle is mounted on the moving mechanism to be movable in the horizontal direction and the vertical direction. The upper end portion of the sampling nozzle is connected to a suck and discharge pump through conduit line, electromagnetic valve and the like. As for these moving mechanisms, piping, mechanism and piping that supply dilution liquid to the measuring chamber 10, a container for housing the specimen liquid, a container for housing a necessary reagent and the like, the prior art can be referred to, and illustration is omitted.

When the particle analyzing apparatus is a blood cell analysis apparatus, conventionally known techniques, for example, JP-A-2014-224754 ("whole blood cell immunoassay apparatus") and the like can be referred to for the detailed mechanisms such as dispense mechanism of the specimen liquid, supplying mechanism of the dilution liquid, supplying mechanism of reagents and the like, and the contents of the operation by the command of the control device.

[Other Piping]

It is preferable to provide a conduit line C3 used for discharging the sample liquid and the like or for injecting a fluid from the outside, at the bottom of the measuring chamber 10. In addition, it is preferable that the syringe device 20 is also provided with a conduit line C4 used for discharging the sucked sample liquid or the like, or for injecting a fluid from the outside. Electromagnetic valve, piping and the like for opening and closing these conduit lines are not shown. [Operation Example of Main Part of the Particle Analyzing Apparatus]

Figure 2:
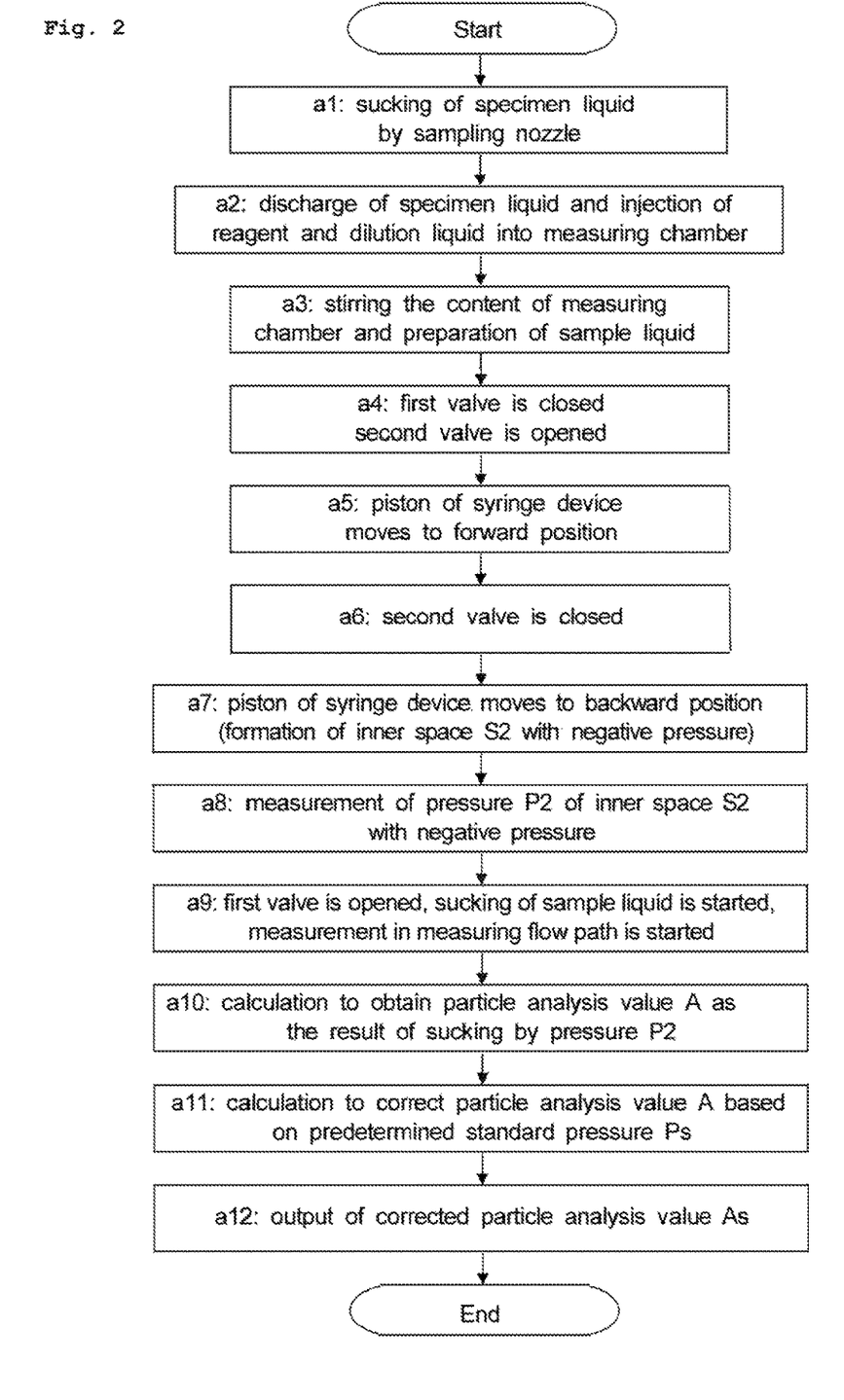
FIG. 2 is a flow chart showing the action of each part in the particle analyzing apparatus of the present invention.

FIG. 2 is a flow chart showing one embodiment of a preferable operation of the main part of the particle analyzing apparatus. The particle to be analyzed is a blood cell, and the operation of each part other than the calculation by the control device itself is performed according to the command of the control device.

As shown in the flow chart in this Figure, in the particle analyzing apparatus, first, in step a1, the sampling nozzle 60 operates, and the specimen liquid (blood) is sucked from the specimen container set in the particle analyzing apparatus.

Then, in step a2, the sampling nozzle 60 moves to the measuring chamber 10, and discharges a predetermined amount of the specimen liquid into the measuring chamber 10. The sampling nozzle 60 further moves and discharges a necessary reagent into the measuring chamber 10. Furthermore, a predetermined amount of the dilution liquid is injected into the measuring chamber 10 by a dilution liquid injecting device (not shown).

Then, in step a3, the sample liquid in the measuring chamber is stirred by the air injected from the conduit line C3, and the sample liquid is prepared. After stirring, the conduit line C3 is closed.

The operations of these steps a1 to a3 may be performed by the first motion control part 71 of the control device 70 or may be performed by a separately provided action control part.

Then, in step a4, the first motion control part 71 closes the first valve 30 and opens the second valve 40. The closing of the first valve 30 does not mean only that the closing operation is performed at this point but also means that it is closed at this point. The closing of the first valve 30 may be performed before step a2 and further in step a1.

Then, in step a5, the first motion control part 71 moves a piston 22 of the syringe device 20 to a forward position L1.

Then, in step a6, the first motion control part 71 closes the second valve 40. The first valve 30 is in a closed state and the cylinder 21 is closed sealingly.

Then, in step a7, the first motion control part 71 moves the piston 22 of the syringe device 20 to a backward position L2, thereby forming the inner space S2 of the negative pressure (pressure P2).

Then, in step a8, the pressure value receiving part 72 accepts the value (pressure measurement signal) of the pressure P2 in the inner space S2 measured by the pressure measuring part 50.

Then, in step a9, the second motion control part 73 opens the first valve 30. As a result, a negative pressure in the inner space S2 is applied to the measuring chamber 10 through the measuring flow path 11, sucking of the sample liquid Y1 is started, and the measurement in the measuring flow path 11 (measurement of pulse voltage (or pulse electric current) between electrodes in FIG. 1) is started.

Then, in step a10, the first calculating part 74 performs an operation to obtain the particle analysis value A as a result of the sucking at pressure P2.

Then, in step a11, an operation to correct the above-mentioned particle analysis value A based on a predetermined standard pressure Ps is executed.

Then, in step a12, the corrected particle analysis value As is output to a display device, a printer, an external computer and the like, whereby a series of operations for particle analysis in one measuring chamber for one sample liquid is completed.

[Preferable Embodiment: Temperature Correction]

In the embodiment described above, the second calculating part of the control device corrects the particle analysis value A as a result of the sucking at the pressure P2 in the inner space Si of the cylinder based on the standard pressure Ps to obtain the particle analysis value As. In a preferable embodiment of the present invention, the particle analysis value may be corrected by also considering the temperature T2 of the inner space S2 when measuring the pressure P2, in addition to the correction relating to the pressure. Temperature T2 is one of the factors affecting the pressure P2 of the inner space S2 and changing the sucking force.

In this embodiment, a temperature measuring part (not shown) for measuring the temperature T1 is provided in the particle analyzing apparatus. The position of the detecting head part of the temperature measuring part is preferably a position at which the temperature inside the cylinder of the syringe device can be measured. Alternatively, it may be a part (outside part, side surface, upper surface) avoiding a temperature rising part in the apparatus and the like.

As the temperature measuring part, a temperature measurement apparatus capable of sending a temperature measurement signal to the control device such as temperature sensor and the like can be utilized.

The second calculating part 75 correlates the periphery temperature T1 measured by the temperature measuring part to the pressure P2 and the predetermined standard temperature Ts to the standard pressure Ps in the correction of the particle analysis value and performs calculation to correct the particle analysis value A to a particle analysis value As.

The standard temperature Ts, like the standard pressure Ps, only needs to be pre-stored in a memory part of the control device or the like or a program or the like for reference by the control device. The standard temperature Ts is not particularly limited, and can be selected from the range of, for example, about 5° C.-45° C. as a standard value for the correction. In a more specific Example, it is 25° C.

When the particle analysis value A is corrected in consideration of the temperature T1 at the time of particle measurement and the standard temperature Ts, for example, correction by the following equation (5) can be mentioned with respect to the particle analysis value A indicating the number of particles in the sample liquid.

particle analysis value $As=(Ps/P2)\times[(273.15+Ts)/(273.15+T1)]\times$ particle analysis value $A$     (5)

In the above-mentioned equation (5), "/" means division as explained above for "(Ps/P2)" of the above-mentioned equation (4).

[Preferable Embodiment: Alarm Function]

In a preferable embodiment of the present invention, as shown in FIG. 1, an alarm generating part 76 is further provided in the control device 70. The alarm generating part 76 outputs an alarm signal to let the user know when the value of the pressure P2 received by the pressure value receiving part deviates from the predetermined range due to the leakage of piping, clogging of sensor and the like. In this embodiment, the pressure measuring part is constituted to also measure the pressure (or pressure change) P3 of the inner space S2 after the first valve is opened. The pressure value receiving part of the control device is constituted to receive the pressure P3 as well. When the value of the pressure P3 deviates from the predetermined range, an alarm signal is output.

The alarm generating part 76 may let the user know that the particle analysis value As may contain some error by correlating the identifying information (e.g., flag and the like) indicating abnormality of the pressure P2 to the corrected particle analysis value As.

The range of the pressure for determining the value of the pressure P2 is not particularly limited. For example, it may be a range predetermined by an annual variation of the atmospheric pressure value (maximum value and minimum value) at the place where the device is used and P2=P1 (V1/V2) derived from the above-mentioned equations (1) and (2). The range of the pressure is preferably pre-stored in a memory part of the control device or the like or a program or the like for reference by the control device.

[Correction of Travel Amount of Piston of Syringe Device]

In the present invention, the travel amount of the piston may be adjusted in accordance with the value of the atmospheric pressure at the time of measurement and the value of the pressure P2 in the inner space S2 and the correction to bring the pressure P2 at the start of suction close to the standard pressure Ps may be performed. However, such correction of the sucking force by the adjustment of the travel amount of the piston requires a complicated control program and a syringe device capable of acting highly accurately corresponding thereto. Therefore, it is convenient to correct the particle analysis value A obtained by the suction by the pressure P2 in the predetermined inner space S2 based on the standard pressure Ps, which is preferable because the apparatus is not expensive.

According to the present invention, a particle analyzing apparatus capable of performing particle analysis with less error while using a syringe device as a sucking pump can be provided.

This application is based on patent application No. 2017-178409 filed in Japan, the contents of which are incorporated in full herein.

The invention claimed is:

1. A particle analyzing apparatus for analyzing a particle in a sample liquid, comprising:
    a measuring chamber for containing the sample liquid containing the particle,
    a measuring flow path connected to the measuring chamber,
    a particle measuring device for outputting a measurement signal relating to the particle when it passes through the measuring flow path,
    a connecting conduit line with one end portion connected to an outlet end side of the measuring flow path,
    a first open-close mechanism provided on the connecting conduit line,
    a syringe device connected to the other end portion of the connecting conduit line,
    a second open-close mechanism connected to the syringe device and for releasing an inner space formed in a cylinder in the syringe device to the atmosphere,
    a pressure measuring part for measuring the pressure in the inner space, and
    a control device,
    wherein the control device comprises
    a first motion control part for closing the first open-close mechanism and opening the second open-close mechanism and for moving a piston of the syringe device to a predetermined forward position L1, and then closing the second open-close mechanism and moving the piston to a predetermined backward position L2, thus forming an inner space S2 with a predetermined volume V2 and a negative pressure in the cylinder,
    a pressure value receiving part for receiving a measurement value of a pressure P2 in the inner space S2 with the negative pressure from the pressure measuring part,
    a second motion control part for opening the first open-close mechanism in a state where the inner space S2 with the negative pressure is formed, and sucking the sample liquid in the measuring chamber through the measuring flow path by the negative pressure to start particle measurement by the particle measuring device,
    a first calculating part for determining a particle analysis value A as a result of sucking at the pressure P2 based on a measurement signal obtained from the particle measuring device, and
    a second calculating part for performing calculation to correct the particle analysis value A based on the pressure P2 and a predetermined standard pressure Ps with respect to the inner space S2, wherein the standard pressure Ps is previously determined as a pressure produced in the cylinder by moving the piston from the predetermined forward positon L1 to the predetermined backward position L2, wherein an atmospheric pressure is known at the that time, the standard pressure Ps being retained or stored in the control device.

2. The particle analyzing apparatus according to claim 1, further comprising a temperature measuring part for measuring a temperature T2 during measurement of the pressure P2, wherein, the second calculating part, is configured to perform calculation to correct the particle analysis value A by associating the temperature T2 with the pressure P2 and associating a standard temperature Ts predetermined with respect to the inner space S2 with the standard pressure Ps.

3. The particle analyzing apparatus according to claim 1, wherein the control device further comprises an alarm generating part for outputting an alarm signal when the value of the pressure P2 deviates from a predetermined range, or for associating identifying information showing abnormality of the pressure P2 with the correction result of the particle analysis value A.

4. The particle analyzing apparatus according to claim 1, wherein the measuring flow path is an aperture for measuring a particle based on an electric resistance method, the aperture having electrodes for the electric resistance method respectively provided as a part of the particle measuring device on an upstream side and a downstream side of the aperture.

5. The particle analyzing apparatus according to claim 1, wherein the measuring flow path is a flow cell for measuring the particle by light irradiation and light reception, the flow cell having a light irradiating part and a light receiving part as a part of the particle measuring device for performing the light irradiation and the light reception, or the measuring flow path is a flow path with a small diameter and constituted to measure the particle by light irradiation and light reception while measuring the particle based on an electric resistance method, and having an electrode pair for the electric resistance method provided as a part of the particle measuring device in a predetermined section thereof, and a light irradiating part and a light receiving part for performing the light irradiation and the light reception.

6. The particle analyzing apparatus according to claim 1, wherein the particle is a blood cell.

* * * * *